Figure 1:
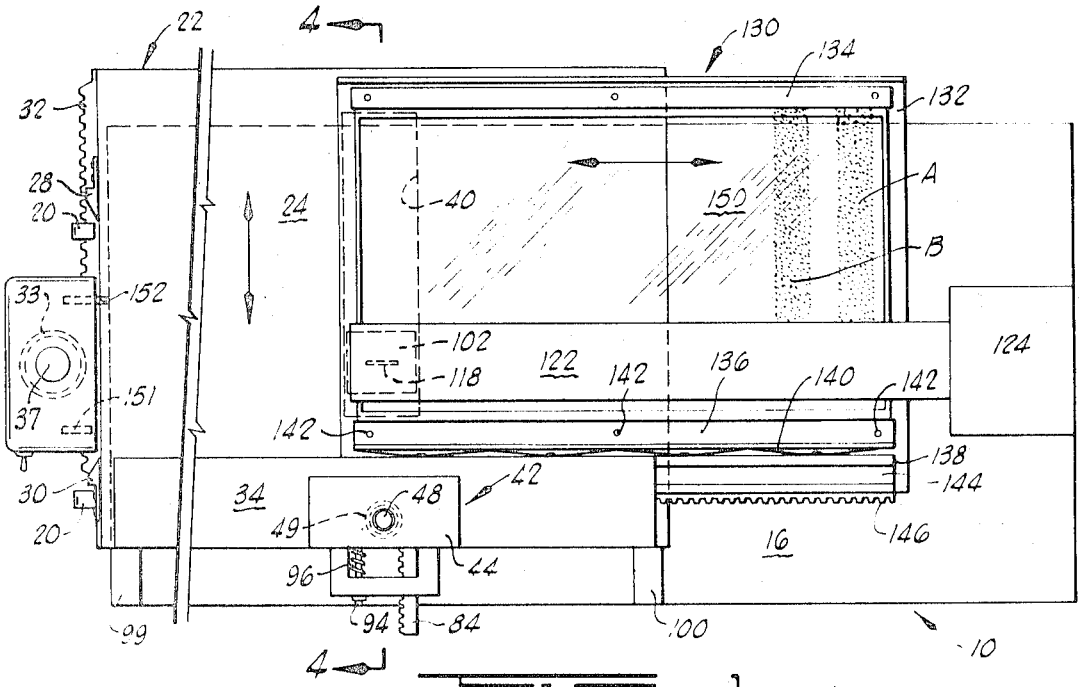
Figure 3:
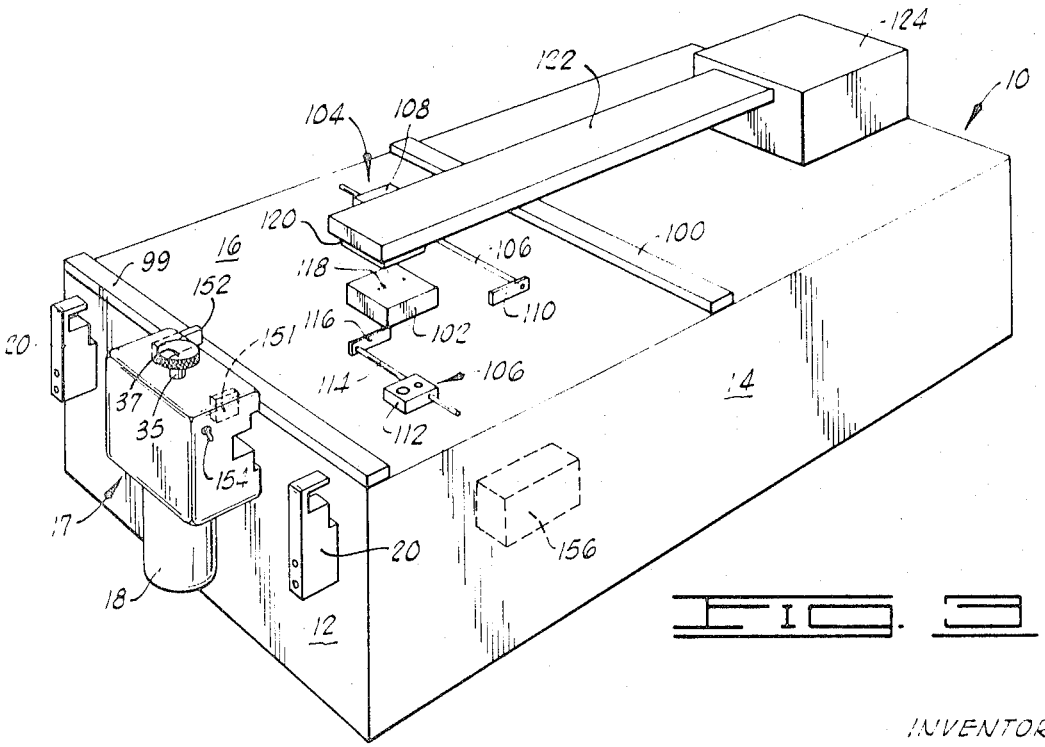
Figure 2:
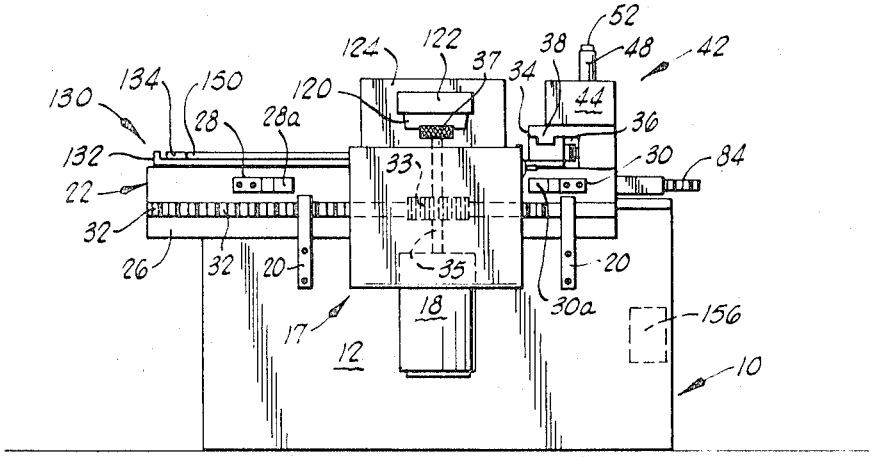
Figure 4:
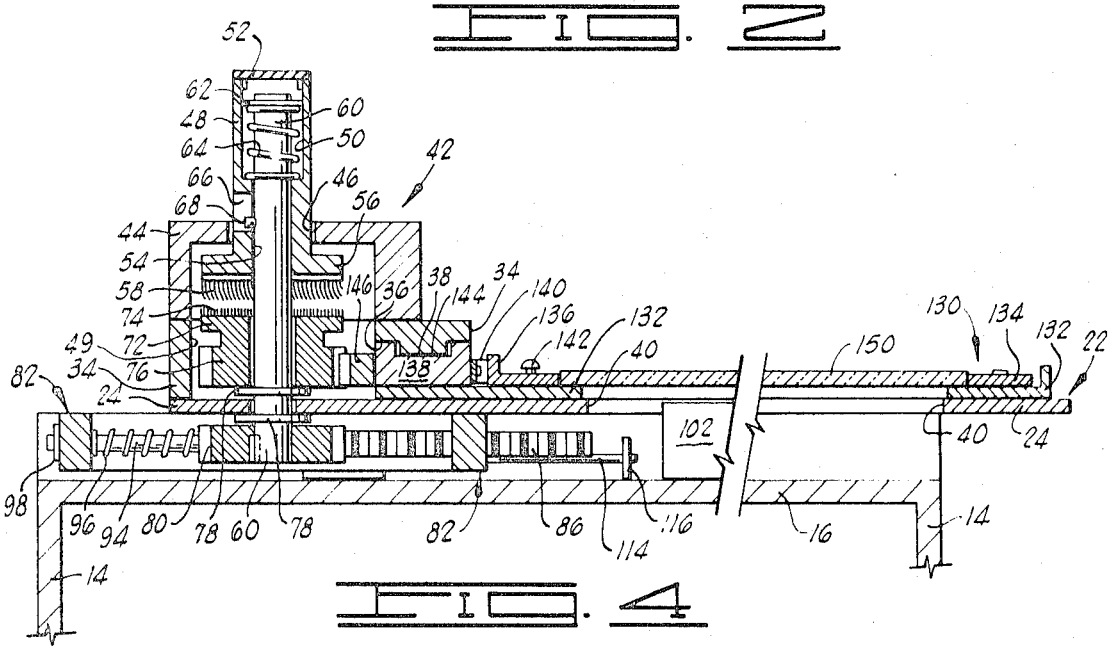
Figure 5:
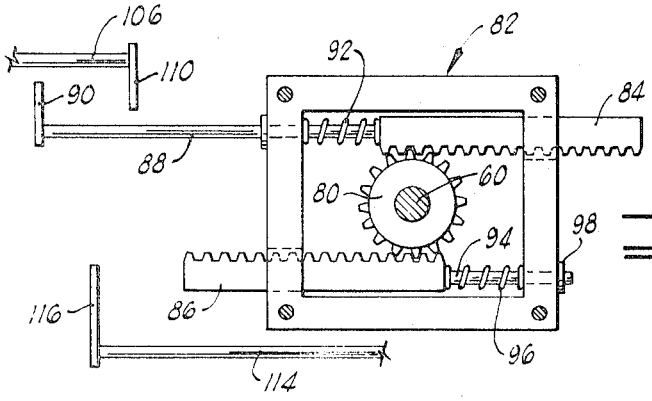
Figure 6:
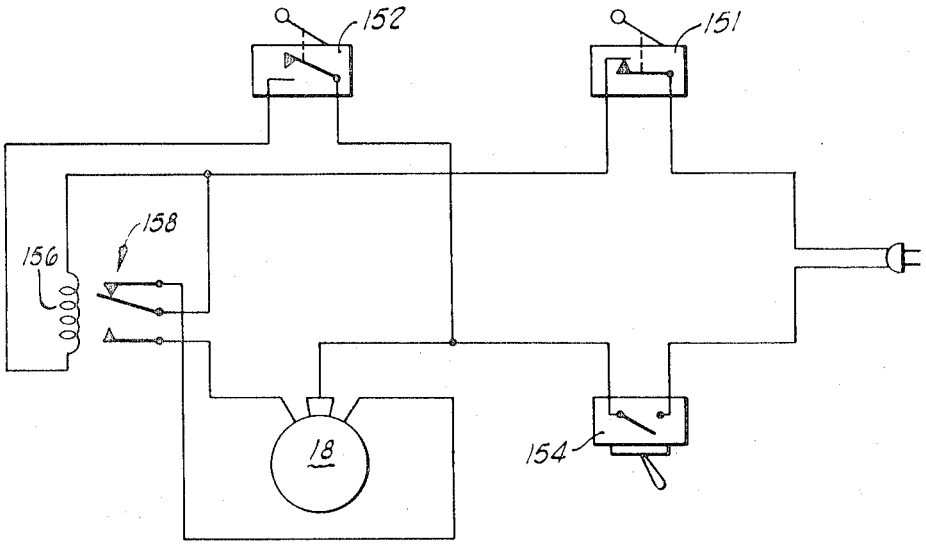
Figure 7:
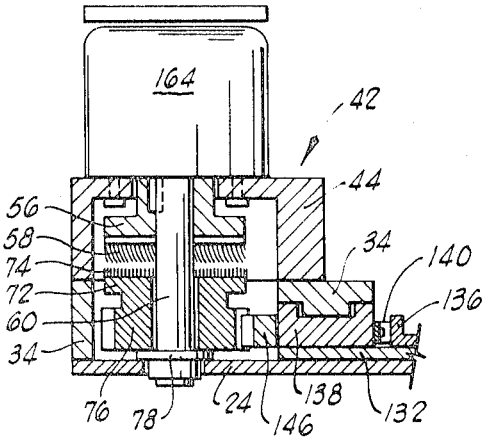
Figure 8:
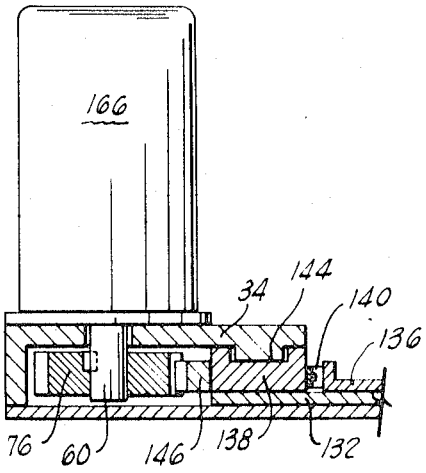

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 403

T893,011

AUTOMATIC TRACK CHANGING APPARATUS

George J. Hanggi and Theodore T. Martin, Ponca City, Okla., assignors to Continental Oil Company, Ponca City, Okla.

Filed Feb. 11, 1971, Ser. No. 114,429
**Int. Cl. G01n *21/30***
U.S. Cl. 250—219 TH
3 Sheets Drawing, 28 Pages Specification

Apparatus for automatically moving a body in alternate transverse and longitudinal movements through a predetermined path, the successive transverse movements being in opposite directions to each other, and the successive longitudinal movements being in substantially the same direction. The apparatus includes a holder for supporting the body; a carriage slidingly supporting the holder; a transverse driving system for automatically driving the carriage in alternating bidirectional strokes in a transverse direction; a longitudinal driving system for automatically driving the holder in a single, selectively distanced longitudinal direction during a selected final increment of each transverse movement of the carriage; stroke termination and reversing means connected to said transverse driving means and cooperating with the carriage to end each transverse stroke of the carriage, and to reverse the drive imparted thereto by the transverse driving system; and manual reset mechanism for manually positioning the carriage and holder at any location

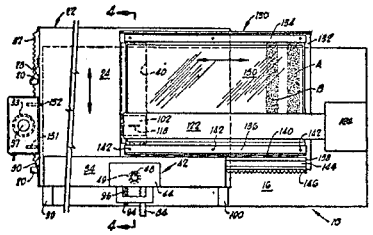

desired within the carriage and holder positioning capability range of the transverse and longitudinal driving systems. The apparatus has a particular utility in an optical densitometer for analyzing chromatographic sample slides or plates.

Dec. 14, 1971 G. J. HANGGI ET AL T893,011

AUTOMATIC TRACK CHANGING APPARATUS

Filed Feb. 11, 1971 3 Sheets-Sheet 1

INVENTORS
GEORGE J. HANGGI
THEODORE T. MARTIN
BY
Bayless E. Rutherford, Jr.
AGENT

AUTOMATIC TRACK CHANGING APPARATUS

Filed Feb. 11, 1971 3 Sheets-Sheet 2

INVENTORS
GEORGE J. HANGGI
THEODORE T. MARTIN
BY Bayless E. Rutherford Jr.
AGENT

AUTOMATIC TRACK CHANGING APPARATUS

Filed Feb. 11, 1971 3 Sheets-Sheet 3

INVENTORS
GEORGE J. HANGGI
THEODORE T. MARTIN
BY
Baylen E. Rutherford, Jr.
AGENT